United States Patent [19]

Chang et al.

[11] Patent Number: 4,708,974

[45] Date of Patent: Nov. 24, 1987

[54] ENHANCED HYDROCARBON RECOVERY BY PERMEABILITY MODIFICATION WITH PHENOLIC GELS

[75] Inventors: Ping W. Chang, Waterford; Gordon D. Gruetzmacher; Clifford N. Meltz, both of Gales Ferry; Rocco A. Totino, Waterford, all of Conn.

[73] Assignee: Pfizer Inc., New York, N.Y.

[21] Appl. No.: 656,801

[22] Filed: Oct. 1, 1984

[51] Int. Cl.$^4$ .................. C08L 61/06; C09K 17/00; E02C 3/12

[52] U.S. Cl. .................. 523/130; 524/841; 166/281

[58] Field of Search .................. 523/130; 524/841

[56] References Cited

U.S. PATENT DOCUMENTS

| | | | |
|---|---|---|---|
| 2,457,160 | 12/1948 | Kurtz | 523/130 |
| 2,512,716 | 6/1950 | Courtney | 523/130 |
| 2,714,929 | 8/1955 | Nowak et al. | 166/33 |
| 3,297,086 | 10/1967 | Spain | 523/130 |
| 3,325,426 | 6/1967 | Markham | 523/130 |
| 3,332,245 | 7/1967 | Caron | 61/36 |
| 4,054,462 | 10/1977 | Stude | 523/130 |
| 4,091,868 | 5/1978 | Kozlowski et al. | 166/250 |
| 4,110,226 | 8/1978 | Swanson | |
| 4,212,747 | 7/1980 | Swanson | |
| 4,246,124 | 1/1981 | Swanson | |
| 4,289,203 | 9/1981 | Swanson | |
| 4,389,320 | 6/1983 | Clampitt | |
| 4,485,875 | 12/1984 | Falk | 523/130 |
| 4,537,918 | 8/1985 | Parcevaux | 523/130 |

*Primary Examiner*—C. Warren Ivy
*Attorney, Agent, or Firm*—Peter C. Richardson; Lawrence C. Akers; Robert F. Sheyka

[57] ABSTRACT

Hydrocarbon recovery from subterranean reservoirs that are penetrated by either injector or producer wells is enhanced by selective permeability modification of the strata of the reservoir with gel-forming phenolic compositions. The injection of the phenolic composition follows a pH sequence specific to the reservoir environment which allows emplacement of the gel-forming composition the desired distance away from the wellbore and production of a uniform gel throughout the treated hydrocarbon-bearing reservoir. The permeability of a treated subterranean reservoir can be restored by treatment of the reservoir with either aqueous hypochlorite or mineral acid.

9 Claims, No Drawings

ENHANCED HYDROCARBON RECOVERY BY PERMEABILITY MODIFICATION WITH PHENOLIC GELS

BACKGROUND OF THE INVENTION

During the recovery of hydrocarbons from subterranean formations, significant amounts of displaceable hydrocarbons are left behind because the reservoir strata are non-homogeneous. The natural drive fluids (e.g. brine or gaseous hydrocarbons) or secondary recovery flooding fluids (e.g. brine, steam, or carbon dioxide) flow through the more permeable strata of the reservoir resulting in progressively less hydrocarbon being recovered per unit volume of fluid produced. This increased ratio of drive or flooding fluid to hydrocarbon is usually referred to as early breakthrough of flooding fluid from injector wells or as excessive water encroachment in producer wells. It is desirable to increase the sweep efficiency, thereby producing more hydrocarbon per unit volume of fluid recovered. Chemicals have been used to achieve increased sweep efficiencies and to enhance hydrocarbon recovery by modifying the permeability of reservoir strata so that the natural or flooding fluids flow through hydrocarbon-rich strata in preference to strata that are more permeable and contain none or smaller amounts of recoverable hydrocarbons.

The chemicals that can be used to modify the permeabilities of subterranean reservoirs must be easily pumpable (i.e. nonviscous) so that they can be easily emplaced into the reservoir sufficiently far from the wellbore so as to be effective. It is desirable for the chemicals to reduce the permeability of the driving or flooding fluids while retaining most hydrocarbon permeability. Their emplacement should be selective in that they are emplaced into and reduce the permeability of reservoir strata more permeable to the driving fluids without seriously affecting the less permeable strata. Gels formed by polyacrylamide (U.S. Pat. No. 3,490,533) or polysaccharides with cations (U.S. Pat. Nos. 3,581,524; 3,908,760; 4,048,079) have been used as permeability modifiers for subterranean reservoirs. However, their application has been limited to subterranean reservoirs with ambient temperatures of less than about 70° C. Major difficulties encountered in using gel forming chemicals in high temperature reservoirs (i.e. >70° C.) include:

(1) Increasing gelation rate with increasing temperature resulting in premature gel formation and therefore plugging of the reservoir strata nearest the wellbore with the needed permeability modification at substantial distances from the wellbore being unattainable (2) Over-crosslinking and syneresis of the gel at elevated temperatures and in high total dissolved solid (TDS) reservoir brines which reduce the effectiveness of the gel as a permeability modifier.

(3) Decomposition by oxidative and/or hydrolytic mechanisms of polysaccharides and polyacrylamides at elevated temperatures with a net result of destruction of gel character. Some of the acrylamide groups of the polyacrylamide hydrolyze to carboxylic acid groups at elevated temperatures which causes the polyacrylamide to form calcium and magnesium salts resulting in precipitates which are undesirable.

Thus, there is a need for high temperature stable chemical compositions that are useful in reservoirs undergoing various fluid floods, especially those undergoing water floods with a variety of brines.

SUMMARY OF THE INVENTION

The present invention uses specific procedures to emplace gel-forming phenolic compositions into subterranean reservoirs and to selectively modify the permeability of the strata of the reservoir. We have found that these compositions will selectively enter the strata of the reservoir more permeable to driving fluids and form gels; thus, effecting a selective permeability modification of the more permeable strata of the reservoir and leaving the less permeable strata relatively less affected. In addition, we have found that these compositions when gelled are selectively more permeable to hydrocarbons than flooding fluids. These gels are novel in that they selectively modify permeability by reducing the permeability of more porous strata of reservoirs and are selectively more permeable to hydrocarbons than to flooding fluids as demonstrated by laboratory sandpacks and field trial results. In general, these phenolic compositions are composed of water-soluble phenols and aldehydes or dialdehydes. Resoles and aldehydes or dialdehydes may also form these gels. Resoles, water-soluble phenols and aldehydes or dialdehydes may be used in this invention.

For example, the present invention comprises in part:

an aqueous, gel-forming composition useful for the selective permeability modification of the strata of a subterranean hydrocarbon-containing reservoir comprising:

(A) An aldehyde or dialdehyde containing 1–6 carbon atoms and (B) A composition selected from:

(1) A compound of the formula:

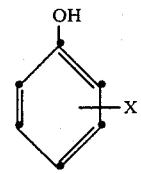

wherein X is selected from ortho and meta —OH, meta —OCH$_2$CH$_2$OH and ortho or para —CH$_2$SO$_3$Na, or a mixture of —CH$_2$SO$_3$Na and —H;

(2) Phenol and 4-phenolsulfonic acid, sodium salt;

(3) Phenol/formaldehyde resole and 4-phenolsulfonic acid, sodium salt; and (4) Phenol/formaldehyde resole and 2,5-dihydroxy-1,4-benzene disulfonic acid, disodium salt.

The weight ratio of components A to B being from 1:2 to 2:1 and the concentration of each in the total aqueous composition being from about 0.25–6.0 weight %.

The composition wherein in component B, X is meta —OH, wherein component A is selected from formaldehyde, acetaldehyde, furfural and glutaraldehyde and wherein the weight ratio is about 1:1 is especially preferred.

Another feature of the present invention is a method for the selective modification of the permeability of the strata of a subterranean reservoir which comprises introducing into the reservoir a gel-forming phenolic composition, initially at a pH above about 9, with subsequent timed introduction accompanied by simultaneous lowering of the pH of the composition to about 7, and thus, obtaining a uniform gel throughout the treated area of the subterranean reservoir. This method is useful for the treatment of both injector and producer wells that penetrate subterranean hydrocarbon-containing reservoirs, and achieves emplacement of the gel-forming compositions at the desired distance from the wellbore.

Another feature of the present invention is a method for the recovery of hydrocarbons from a subterranean hydrocarbon-containing reservoir that is undergoing fluid flooding by selective permeability modification of the reservoir which comprises introducing into the reservoir a gel-forming phenolic composition at a pH above about 9 and continuing the introduction while simultaneously lowering the pH of the composition to about 7, thus, obtaining a uniform gel throughout the treated area of the reservoir and resuming fluid flooding of the reservoir.

The gels produced by the method described above are also novel and are also a feature of this invention.

A final feature of the present invention is a method for restoring the permeability of a subterranean reservoir modified by the methods of this invention comprising contacting the gel in the reservoir with an oxidizing agent or an acid.

DETAILED DESCRIPTION OF THE INVENTION

Synthetic phenol/formaldehyde (or other aldehyde or ketone) polymers have been used for over 70 years for such diverse applications as wood composites, fiber bonding, laminates, foundry resins, abrasives, friction materials, molding materials, coatings, soil grouting and adhesives (G. L. Brode, Kirk-Othmer Encyclopedia of Chemical Technology, Vol. 17, p. 384, 1982). Such polymers have been called resins and are made from concentrated solutions of the reactant phenolic chemicals and formaldehyde. In soil grouting, very concentrated solutions of resorcinol and formaldehyde are employed to stabilize soil by forming resins. U.S. Pat. No. 3,332,245 teaches that the weight of resorcinol and formaldehyde in the soil grouting solution must be about at least 30% of the weight of the treated soil. Certain phenolic compounds when reacted with an aldehyde or dialdehyde in dilute aqueous solutions have been found in this invention to form gels and gelatinous-precipitates that are useful as permeability modifiers of the strata of subterranean reservoirs. When gelled, these compositions selectively modify the strata of the subterranean reservoir so that the flow of the drive or flooding fluids is altered throughout all of the treated strata of the reservoir. In addition, the gelled compositions also have the heretofore unreported property of having selective oil to water permeablility. The gelled phenolic compositions are more permeable to oil than to water, an important advantage when the flooding fluid is brine or fresh water and large amounts of water are co-produced with hydrocarbons in a hydrocarbon-bearing reservoir.

The aqueous gel forming compositions useful for this invention are comprised of:
(A) an aldehyde or dialdehyde, and
(B) a composition selected from
(1) a synthetic phenol given by the general formula

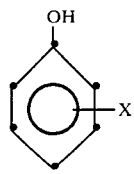

wherein a substituent that imparts both water solubility and brine compatability such as —OH, —CH$_2$SO$_3$H(Na), —CO$_2$H(Na), —OCH$_2$CH$_2$OH and the like; other substituents may be on the aromatic ring so long as they do not inhibit water and brine solubility and do not block the reactive 2,4, and 6 positions of the phenol. Other aromatic hydroxy substituted compounds may be used such as naphthols.

(2) a mixture of one of the above and a phenol/formaldehyde resole; or
(3) a mixture of a sulfonated phenol and a phenol/formaldehyde resole.

The materials used to make the gelling compositions of this invention are products of commerce or ones easily prepared by standard methods.

Among the compositions that have been found to be extremely useful in this invention and are especially preferred are mixtures of resorcinol and formaldehyde; resorcinol and acetaldehyde; resorcinol and glutaraldehyde; resorcinol and furfural; 3-(2-hydroxyethoxy)-phenol and formaldehyde; phenol, 4-phenolsulfonic acid, sodium salt, and formaldehyde; sulfomethylated phenol and formaldehyde; or phenol/formaldehyde resole, 4-phenolsulfonic acid, sodium salt, and formaldehyde. Preferred weight ranges are from about 0.25–6.0 weight % of the aldehyde or dialdehyde and from about 0.25–6.0 weight % of the phenol component(s)·based on upon the total aqueous solution. The ratio of the aldehydic component to phenolic component(s) being from about 1:2 to 2:1, the especially preferred ratio is about 1:1.

Those skilled in the art of permeabilty modification know that the brine salinity and hardness as well as reservoir temperature will determine if a certain composition will be useful under those specific conditions. In some instances, careful selection of the components of the gel will be necessary to achieve optimal gels or gelatinous-precipitates that are useful for the permeability modification of subterranean reservoirs. The compositions of this invention have been found to form gels and gelatinous-precipitates under a wide range of conditions. The aqueous environment can be fresh water (i.e. water of low TDS) or brines of up to about 20% TDS. The useful temperature range is from about 25° to 120° C. with the upper part of the range, 80° to 120° C. being most useful.

Another feature of the present invention is a method for the selective permeability modification of the strata of a subterranean reservoir which comprises:
(A) introducing into the formation a gel or gelatinous-precipitate forming composition as stated above at a pH above about 9;
(B) continuing the introduction while simultaneously lowering the pH of the composition to about 7, thus, obtaining uniformly a gel or a gelatinous-precipitate throughout the treated area of the subterranean reservoir.

Practicing this method will allow those skilled in the art to modify the permeability of the strata of a hydrocarbon bearing reservoir such that the fluid flow is altered throughout the strata of the reservoir. This permeability modification will allow increased sweep efficiency of the flooding or drive fluids and will result in enhanced hydrocarbon recovery per unit volume of fluid flood. It is especially important to achieve emplacement of the gel composition at substantial distances from the wellbore. Proper emplacement of the gel compositions is achieved by pH and concentration control. At pH's greater than about 9, the gel time of the compositions is sufficiently long so that the compositions can be emplaced in the subterranean reservoir at the desired distance from the wellbore. Those skilled in the art can determine the optimal distance from the wellbore that the gel-forming composition must be emplaced in order to form an effective gel for permeability modification. The gel-forming composition can be maintained above pH 9 for the period of time required to emplace the composition the desired distance away from the wellbore; then the pH of the composition can be adjusted to about 7 in order to assure rapid gelation near the wellbore and a uniform gel throughout the treated area of the reservoir. Alternatively, the pH of the gel-forming composition can be gradually and continuously reduced from above 9 to about 7 or be reduced in a stepwise fashion during the emplacement period from pH above 9 to about pH 7. The gel-forming composition is then allowed time to form a gel or gelatinous-precipitate; the period of time required for gelation is from 15 min. to 30 days. The preferred gelation time is from 2 hr to 7 days.

An especially productive use of this invention is for the treatment of hydrocarbon bearing subterranean reservoirs that are penetrated by injector wells. Once gelled, the gel-forming compositions of this invention allow the flow of injected flooding fluid to be altered throughout the treated strata of the hydrocarbon-bearing reservoir such that the sweep efficiency of the flooding fluid is increased and enhanced hydrocarbon recovery is observed. Another productive use of this invention is for the treatment of producer wells penetrating hydrocarbon-bearing reservoirs that are producing excessive amounts of water or brine because of excessive water encroachment (coning). This invention will allow the emplacement of gels in such a manner that water coning will be reduced in producer wells.

A further feature of this invention is that the permeability of gel treated subterranean reservoirs can be restored toward their original state by treatment with aqueous solutions of either oxidizing agents or mineral acids. At some time it may be desirable to restore a subterranean reservoir to its pretreatment state. This may be easily done by injecting aqueous solutions of oxidizing agents such as hypochlorite in volumes 1-10 times that of the volume of gel-forming solution used to treat the subterranean reservoir. Other oxidizing agents may also be used. A preferred oxidizing agent is 1-10% aqueous sodium hypochlorite. The permeability may also be restored by treatment of the treated reservoir with aqueous acids in volumes 1-10 times that of the volume of gel-forming solution used to treat the subterranean reservoir. A preferred acid is aqueous hydrochloric acid in 1-37% concentration.

The examples to follow are illustrative and do not limit the scope of the claims.

EXAMPLE 1

A series of ampoule tests were made to screen gel-forming compositions. A gel solution was made by mixing the active ingredients in a brine at room temperature in a beaker. The pH of the solution was adjusted by adding caustic, acetic acid or hydrochloric acid solution with vigorous stirring. A glass ampoule connected to a vacuum pump and a nitrogen cylinder through Tygon tubing was evacuated and nitrogen introduced successively three times to remove oxygen. About 30 ml of gel solution was injected into the ampoule through the Tygon tubing leaving about one-third of the ampoule volume as headspace. The gel solution was degassed by application of vacuum and the ampoule was sealed at the neck. The sealed ampoule was immersed in an oil or air bath at the experimental temperature. Gel time was determined by observing the point at which the aqueous phase turned into an immoble gel or gelatinous-precipitate. Syneresis of the gel phase was defined by the volume percent of water phase present at least 30 days after the gel or gelatinous-precipitate formed. Reagent grade chemicals were used. The composition of the various brines used are given in Table 1.

TABLE I

| | Brine Composition | | | | | |
|---|---|---|---|---|---|---|
| Type | I | II | III | IV | V | VI |
| Nominal TDS*, % | 0.0547 | 1.08 | 3.5 | 7.5 | 9 | 20 |
| mg/kg | | | | | | |
| Na+ | 172 | 4215 | 10890 | 22500 | 23000 | 74023 |
| K+ | — | 11 | 460 | — | 12500 | — |
| Ca+2 | 12 | 43 | 428 | 4500 | 2525 | 11499 |
| Mg+2 | — | 10 | 1368 | 900 | 379 | 2072 |
| Cl− | 180 | 5800 | 19700 | 45156 | 51193 | 114000 |
| SO4−2 | — | 30 | 2960 | — | 302 | 10 |
| HCO3− | 183 | 1366 | 124 | — | 332 | — |
| Others | — | — | — | — | — | 167** |

*TDS = total dissolved solids
**including Mn, Si, Fe, B

Ampoule experiments showed that the gelation ratre is controllabe by pH at 92° C. in a 1.08% TDS brine, Table II

TABLE II

| Resorcinol-Formaldehyde Gels | | | | |
|---|---|---|---|---|
| Active Concentration in brine, % | | | Gel Time, | Syneresis |
| Resorcinol[1] | Formaldehyde[2] | pH | min | % |
| 0.5 | 0.5 | 5 | 60 | Gelatinous-precipitate |
| 0.5 | 0.5 | 6 | 35 | 60 |
| 0.5 | 0.5 | 7.6 | 25 | 0 |
| 0.5 | 0.5 | 7.9 | 30 | 0 |
| 0.5 | 1.0 | 9.5 | 4080 | 0 |
| 0.5 | 1.0 | 10 | 2512 | 10 |

[1]Reagent grade resorcinol flakes.
[2]Reagent grade formaldehyde solution of 37% active concentration.

Paraformaldehyde was used in place of formaldehyde solution; it was also an effective gelling component, Table III.

TABLE III

| Resorcinol-Paraformaldehyde Gels | | | | |
|---|---|---|---|---|
| Active Concentration in brine, % | | | Gel Time, | |
| Resorcinol[1] | $(CH_2O)_n$[2] | pH | min. | Syneresis, % |
| 0.5 | 0.25 | 8.7 | 50 | 15 |
| 0.5 | 0.5 | 7.6 | 28 | 10 |
| 0.5 | 0.5 | 9.0 | 1440 | 30 |

TABLE III-continued

Resorcinol-Paraformaldehyde Gels

| Active Concentration in brine, % | | | Gel Time, | |
|---|---|---|---|---|
| Resorcinol[1] | $(CH_2O)_n$[2] | pH | min. | Syneresis, % |
| 0.5 | 1.0 | 7.6 | 16 | 0 |
| 0.5 | 1.0 | 9.5 | 4500 | 5 |

[1]Reagent grade resorcinol flakes.
[2]Reagent grade paraformaldehyde.

The following mixtures did not afford gels under the conditions employed at 92° and in 1.08% TDS brine, Table IV.

TABLE IV

Attempts to Form Gels in 1.08% TDS Brine

| Component 1 (Active Conc., %) | Component 2 (Active Conc., %) | pH |
|---|---|---|
| Resorcinol (0.5) | Glyoxal (1) | 5–7 |
| Resorcinol (0.5) | Glucose (1) | 5.8–7.9 |
| Resorcinol (0.5) | Acetone (0.25–0.5) | 7.9–8.0 |
| Resorcinol (0.5) | Propionaldehyde (0.2–0.5) | 7.7 |
| Resorcinol (0.5) | Glutaraldehyde (0.05) | 8.1 |
| Catechol (0.5) | Formaldehyde (0.5) | 9.0 |
| Hydroquinone (0.5) | Formaldehyde (0.5) | 9.0 |

However under other conditions and at different concentrations gels were formed, Table V.

TABLE V

Gels Formed at Various Conditions

| Component 1 (Active Conc., %) | Component 2 (Active Conc., %) | Temp., °C. | pH | Brine, % TDS | Gel Time |
|---|---|---|---|---|---|
| Catechol (2.5) | Formaldehyde (2.5) | 105 | 7 | 1.08 | 24 hr |
| Catechol (2.5) | Formaldehyde (2.5) | 120 | 7 | 1.08 | 30 min |
| Catechol (2.5) | Formaldehyde (2.5) | 120 | 7 | 3.5 | 30 min |
| Resorcinol (2.5) | Glutaraldehyde (2.5) | 105 | 7 | 1.08 | 24 hr |
| Resorcinol (2.5) | Glutaraldehyde (2.5) | 105 | 7 | 3.5 | 24 hr |
| Resorcinol (0.5) | Furfural (1.0) | 92 | 9–9.5 | 3.5 | 2 days |
| Resorcinol (0.5) | Furfural (1.0) | 92 | 9–9.5 | 7.5 | 2 days |
| Resorcinol (0.5) | Propionaldehyde (0.5) | 92 | 9–9.5 | 3.5 | 30 min |
| Resorcinol (0.5) | Propionaldehyde (0.5) | 92 | 9–9.5 | 9 | 30 min |
| Resorcinol (0.5) | Propionaldehyde (0.5) | 92 | 9–9.5 | 20 | 30 min |

EXAMPLE 2

Following the procedures described in Example 1, this set of ampoule tests demonstrated the gelation time or syneresis of the gel-forming compositions containing resorcinol and formaldehyde was controllable by the concentration of resorcinol and formaldehyde or by pH in a 1.08% TDS brine at 92° C.

| | Concentration, % | | Gel Time, | |
|---|---|---|---|---|
| pH | Resorcinol | Formaldehyde | min. | Syneresis, % |
| 7.7 | 0.5 | 0.5 | 30 | 0 |
| 7.7 | 0.5 | 0.25 | 60 | 5 |
| 7.7 | 0.5 | 0.1 | No gel | — |
| 5.0 | 0.5 | 0.5 | 60 | Gelatinous-Precipitate |
| 6.0 | 0.5 | 0.5 | 35 | 60 |
| 7.6 | 0.5 | 0.5 | 25 | 0 |
| 8.3 | 0.5 | 0.5 | 2100 | 0 |
| 7.8 | 0.05 | 0.5 | No gel | — |
| 7.8 | 0.125 | .05 | 480 | 60 |
| 7.8 | 0.25 | .05 | 60 | 30 |
| 9.3 | 0.25 | 0.25 | No gel | — |
| 9.3 | 0.25 | 0.5 | 5760 | 10 |
| 8.3 | 0.25 | 1.0 | 2100 | 40 |
| 9.3 | 0.5 | 0.5 | 2100 | 0 |
| 9.3 | 0.5 | 1.0 | 1920 | 0 |

EXAMPLE 3

Following the same procedures described in Example 1 ampoule tests showed that gel time was controllable at various temparatures by pH in a 1.08% TDS brine, at 0.5% resorcinol and 0.5% formaldehyde concentrations.

| Temperature, °C. | pH | Gel Time, min. |
|---|---|---|
| 70 | 7.7 | 115 |
| 70 | 8.5 | 115 |
| 70 | 9.1 | 2200 |
| 92 | 7.7 | 30 |
| 92 | 8.4 | 25 |
| 92 | 9.1 | 2030 |
| 105 | 7.7 | 10 |
| 105 | 8.6 | 85 |
| 105 | 9.1 | 1765 |

EXAMPLE 4

Following the same procedures described in Example 1, the following compositions afforded gels in the indicated brines.

| Brine, % TDS | Temp. °C. | Component 1 (Active Conc., %) | Component 2 (Active Conc., %) | pH | Gel Time, min. |
|---|---|---|---|---|---|
| 0.0547 | 100 | Resorcinol (0.5) | Formaldehyde (0.5) | 7.3 | 25920 |
| 0.0547 | 100 | Resorcinol (0.75) | Formaldehyde (0.75) | 7.3 | 8640 |
| 0.0547 | 100 | Resorcinol (0.75) | Formaldehyde (0.75) + NaCl (0.05) | 7.3 | 720 |
| 1.08 | 92 | Resorcinol (0.5) | Formaldehyde (0.5) | 7.7 | 30 |
| 3.5 | 92 | Resorcinol (0.5) | Formaldehyde (0.5) | 9.2 | 15 |
| 3.5 | 92 | Resorcinol (0.5) | Acetaldehyde (0.75) | 9.2 | 50 |
| 9 | 105 | Resorcinol (0.5) | Formaldehyde (0.5) | 7.1 | 20 |
| 20 | 82 | Resorcinol (1.0) | Acetaldehyde (0.5) | 9.0 | 7200 |
| 20 | 105 | Resorcinol (0.2) | Formaldehyde (0.5) | 8.5 | 30 |

EXAMPLE 5

4-Phenolsulfonic acid, sodium salt, (1.0 g), phenol (2.0 g), and 37% aqueous formaldehyde (5.4 ml) were dissolved in 100 ml of 7.5% TDS brine and the pH was adjusted to 7 with aqueous sodium hydroxide. An aliquot of this solution was placed in an ampoule; the ampoule was sealed and heated at 105° C. for 4 days to afford a gelatinous-precipitate.

EXAMPLE 6

4-Phenolsulfonic acid, sodium salt, (3.0 g), phenol (2.0 g), and 37% aqueous formaldehyde (5.4 ml) were dissolved in 100 ml of 9% TDS brine and the pH was adjusted to 7 with aqueous sodium hydroxide. An aliquot of this solution was placed in an ampoule; the ampoule was sealed and heated at 120° C. for 7 days to afford a gel.

EXAMPLE 7

4-Phenolsulfonic acid, sodium salt (3.0 g), phenol (2.0 g), and 37% aqueous formaldehyde (5.4 ml) were dissolved in 100 ml of 7.5% TDS brine and the pH was adjusted to 7 with aqueous sodium hydroxide. An aliquot of this solution was placed in an ampoule; the ampoule was sealed and heated at 105° C. for 10 days to afford a gel.

EXAMPLE 8

4-Phenolsulfonic acid, sodium salt, (3.0 g), phenol (2.0), and 37% aqueous formaldehyde (5.4 ml) were dissolved in 100 ml of 7.5% TDS brine and the pH was adjusted to 4 with acetic acid. An aliquot of this solution was placed in an ampoule; the ampoule was sealed and heated at 105° C. for 10 days to afford a gelatinous precipitate.

EXAMPLE 9

4-Phenolsulfonic acid, sodium salt (0.5 g), phenol (1.0 g) and 37% aqueous formaldehyde (2.7 ml) were dissolved in 100 ml water and the pH was adjusted to 4 with aqueous acetic acid. An aliquot of this solution was placed in an ampoule; the ampoule was sealed and heated at 105° for 11 days to afford a gel.

EXAMPLE 10

Phenol (5.00 g), sodium sulfite (4.02 g) and 37% aqueous formaldehyde (3.2 ml) were combined in a round bottom flask and the pH was adjusted to 10.5 with 20% aqueous sodium hydroxide. The reaction mixture was heated for 4 hours at 100° C. After this time the reaction mixture was vacuum filtered through a fine sintered glass funnel to remove the small amount of particulate matter. A portion of the filtered aqueous product (2.5 g) was combined with 37% aqueous formaldehyde (6.0 ml), isopropyl alcohol (6.0 ml), and 25 ml of 1.08% brine. The resultant solution, pH 10, was heated for 18 hours at 100° C. and afforded a gel.

EXAMPLE 11

3-(2-Hydroxyethoxy)phenol(0.5 g) was combined with 37% aqueous formaldehyde (2.0 ml) and 10 ml of 1.08% brine to afford a clear solution. The pH of this solution was adjusted to 8.7 with 20% aqueous sodium hydroxide. The solution was heated at 100°–105° C. for 17 hours to afford a gel.

EXAMPLE 12

Resinox 504 (10 ml, 60% solids; commercial resole manufactured by Monsanto) was combined with 37% aqueous formaldehyde (1.0 ml) and 4-phenolsulfonic acid, sodium salt (0.19 g) in 10 ml of water. The solution was titrated to clarity with 0.2N sodium hydroxide. The pH was 9.5, and the total volume was 35 ml. The solution was heated at 100°–105° C. for 16 hours to afford a gel.

EXAMPLE 13

The procedure of Example 12 was repeated except that instead of 0.2N sodium hydroxide, isopropyl alcohol was used. Likewise a gel was formed.

EXAMPLE 14

The procedure of Example 12 was repeated but the amount of 4-phenolsulfonic acid, sodium salt, used increased to 0.38 g. Likewise, a gel was formed.

EXAMPLE 15

The procedure of Example 12 was repeated using 2,5-dihydroxy-1,4-benzene-disulfonic acid, disodium salt, instead of phenolsulfonic acid, sodium salt. Again, a gel was formed.

EXAMPLE 16

The procedure of Example 15 was repeated using 0.38 g of 2,5-dihydroxy-1,4-benzenedisulfonic acid, disodium salt. A gel was formed.

EXAMPLE 17

A sandpack test demonstrated that the permeability of sand was modified by the gel produced by the gel-forming composition.

A mixture of New England silica sand was made of two lots at particle size distributions of (1) 60–120 mesh and (2) 200 mesh. The weight ratio was 5 parts coarse sand and 1 part fine sand. The mixture was packed in a 12 in. long stainless steel cylinder of 1 in. inside diameter with the top and the bottom ¼ in. packed with coarse sand. Pressure taps were located at the inlet, the outlet, 1.5 in. from inlet and 1.5 in. from the outlet. The sandpack was saturated with tap water and then immersed in an air bath at 92° C. Brine (1.08% TDS) was injected into the sandpack at 1 cc/min flow rate until the pressure stabilized. The experiment was run at 50 psig back-pressure regulated at the outlet to prevent liquids from vaporizing. Permeabilities were determined by measuring flow rates and pressure drops across the sandpack and across the two taps within the sandpack.

Paraffin oil (Fischer Scientific USP Grade) was injected at 1 cc/min into the sandpack until brine was no longer displaced and at a steady pressure drop across the sandpack. Permeability to oil at the residual brine saturation was 154 millidarcies (md). The sandpack was then flooded with brine at 1 cc/min until residual oil saturation was attained. Permeability to brine at this point was 99.7 md.

A gel-forming solution of 1% resorcinol and 1% formaldehyde in 1.08% TDS brine at pH 7.3 prepared according to procedures described in Example 1 was injected from an accumulator at room temperature into the sandpack at 1 cc/min for 40 minutes. Brine (10 ml) was injected to flush the gel solution from the tubing between the accumulator and the sandpack, and into the sandpack. The sandpack was then shut-in. The gel solution was also injected into an ampoule as described in Example 1 to observe the gel time at 92° C.

After the gel formed in the ampoule, brine was injected at 1 cc/min into the sandpack. The permeability to brine had decreased to 12.9 md. Oil injection at 1 cc/min until residual water saturation gave a permeability to oil of 58.9 md.

The sandpack was maintained at 92° C. for 10 months. The permeability modification was maintained.

EXAMPLE 18

In an experiment similar to Example 17, but with two sandpacks connected in parallel, the gel-forming composition preferentially decreased the permeability of the sandpack more permeable to brine.

One tight sandpack was made of the sand mixture of 5 parts course sand to 1 part fine sand. A loose sandpack was made of the mixture of 8 parts coarse sand to 1 part fine sand. The tight sandpack was prepared before gelation as described in Example 5 at 92° C. and 50 psig back pressure. Its permeability to brine at residual oil saturation was 76.7 md. The loose sandpack was flooded with brine only, without the oil imbibition step, and its permeability to brine was 1140 md.

The two sandpacks were connected in parallel. Brine (1.08% TDS) was injected at 2 cc/min. Most of the flow was through the loose sandpack. A gelforming solution was prepared according to procedures in Example 1 with 0.5% resorcinol and 0.25% formaldehyde in the brine at pH 7.3. The gel solution (55 ml) was injected into the parallel sandpacks followed by 20 ml of brine to flush the tubing. The sandpacks were shut-in until the gel-forming composition in an accompanying ampoule gelled.

Brine injection was resumed at 2 cc/min. Permeabilities of the sandpacks were 67.1 md for the tight one and 69.6 md for the loose one. The flow rates through the sandpacks were equalized. This experiment demonstrated the selective permeability modification properties of the gel-forming composition where the permeability of the more permeable (loose) sandpack was reduced to a greater extent than the less porous (tight) sandpack and that after treatment the flow of fluids through the sandpacks was equalized.

EXAMPLE 19

The permeability of the strata of a hydrocarbon-bearing subterranean reservoir was modified by treatment with a mixture of resorcinol and formaldehyde. The reservoir was in Wyoming and the hydrocarbon payzone was in the Minnelusa formation. The reservoir temperature was 92° C. Field brine (1.08% TDS) was injected into the reservoir via an injector well perforated between the −8832 and −8854 ft depths, the hydrocarbon payzone. The injection log indicated that most of the injection fluid flowed into a highly permeable channel located between the −8862 and −8880 ft depths.

The treatment sequence started with a 12 hour preflush of the reservoir by the field brine at a flow rate of 890 bbl/day. The pH of the preflush field brine was adjusted to 9.6 at the wellhead with aqueous sodium hydroxide solution in order to prevent premature gelation near the wellbore of the gel-forming composition. During the next 46 hours an in-line mixed solution of 0.5% resorcinol, 0.5% formaldehyde and sodium hydroxide adjusted to a solution pH of 9.2 in the field brine was injected into the reservoir. This injection period was designed to emplace the gel-forming composition the desired distance away from the wellbore. In the next 2 hours of the treatment period the pH of the resorcinol/formaldehyde solution was adjusted to 7.5 to form a strong gel near the wellbore. Next the well tubing was flushed with field brine adjusted to pH 9.5 with aqueous sodium hydroxide in order to avoid gelation of the gel composition in the well tubing.

The injector was shut-in for 8 days to allow gelation of the composition in the reservoir. When fluid flooding of the reservoir was resumed, the injection water rate at the injector wellhead was at least halved at the same surface pressure indicating successful gelation of the gel-forming resorcinol/formaldehyde composition. A post-injection profile survey showed that injected field brine was diverted to between the desired −8835 to −8855 ft depths. Enhanced recovery of hydrocarbons was observed at a producer well located 2000 ft from the injector one month after the treatment.

EXAMPLE 20

A sandpack of 174 millidarcy (md) permeability prepared as described in Example 17 was imbibed with oil to 95 md oil permeability at residual water saturation. Waterflood until residual oil saturation was achieved and gave a water permeability of 81 md. A mixture of 9.82% Resinox-504 and 5.33% formaldehyde in 7.5% TDS brine at pH 8.2 was injected into the sandpack at 105° C. After 3 days to allow the composition to gel, the water permeability of the sandpack was found to be 46 md at residual oil saturation. The permeability to oil was found to be 46 md at residual water saturation.

EXAMPLE 21

A mixture of 0.5% resorcinol and 0.5% formaldehyde in 1.08% TDS brine at pH 9.1 was injected into a sandpack prepared as described in Example 17 of 31 cc pore volume at 92° C. and allowed to gel. The gel that formed reduced the water permeability of the sandpack from 997 md to 100 md. The sandpack was then injected with 90 ml of 5.25% sodium hydrochlorite solution (Clorox). Removed gel was observed in the effluent from the sandpack after 50 ml of the hypochlorite solution had been injected. Water permeability of the sandpack was increased to 443 md.

EXAMPLE 22

A sandpack of 177 md permeability to brine at residual oil saturation was treated with a gel composition of 0.5% resorcinol and 0.5% formaldehyde at pH 7.3 as described in Example 17. When the permeability of the sandpack was retested, the permeability was reduced to 87.4 md. The sandpack was successively flooded with 0.7 pore-volumes of each of 1, 9, and 20% TDS brine. The permeability was found to be stabilized at 53 md. The sandpack was then acidized with one pore-volume of 8% aqueous hydrochloric acid solution. The brine permeability of the sandpack was found to be 103 md. The sandpack was further treated with one pore-volume of 20% aqueous hydrochloric acid. The brine permeability of the sandpack was found to be 161 md. Thus, the original permeability of the sandpack was restored by acidization.

We claim:
1. A gel-forming composition useful for the selective permeability modification of the strata of a subterranean hydrocarbon-containing reservoir comprising

(A) an aqueous medium selected from the group consisting of fresh water and reservoir brines having a total dissolved solids content ranging from about 0.05 to about 20 percent;
(B) a monoaldehyde of from 1 to 2 carbon atoms; and
(C) a compound selected from the group consisting of
(1) a compound of the formula

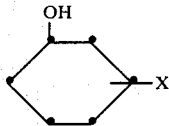

where X is meta OH, meta—OCH$_2$CH$_2$OH and ortho or para-CH2SO$_3$Na or a mixture of said —CH$_2$SO$_3$Na and H; and
(2) the sodium salt of 4-phenolsulfonic acid; the weight ratio of components (B) to (C) being from 1:2 to 2:1 and the concentration of each in the total composition ranging from about 0.25 to about 5 weight percent with components (B) and (C) being combined at a pH of between 5 and 10.0 and at a temperature of from about 25° C. to about 120° C., wherein gellation is achieved by reacting only components (B) and (C) at said concentration range in the aqueous media and gellation is controlled by said pH range.

2. The composition of claim 1 wherein component (B) is selected from the group consisting of formaldehyde and acetaldehyde and in component (C), X is meta OH.

3. The composition of claim 2 wherein component (B) is formaldehyde.

4. The composition of claim 2 wherein component (B) is acetaldehyde.

5. The composition of claim 1 wherin component (B) is formaldehyde and component (C) is the sodium salt of 4-phenolsulfonic acid.

6. The composition of claim 1 wherein component (B) is formaldehyde and in component (C), X is ortho or para—CH$_2$SO$_3$Na or a mixture of said —CH$_3$SO$_3$Na and —H.

7. The composition of claim 1 wherein the total concentration of each of (B) and (C) in the aqueous medium ranges from about 0.25 to about 4.0 weight percent.

8. The composition of claim 7 wherein the total concentration of each of (B) and (C) in the aqueous medium ranges from about 0.25 to about 3.0 weight percent.

9. The composition of claim 8 wherein the total concentration of each of (B) and (C) in the aqueous medium ranges from about 0.25 to about 1.5 weight percent.

* * * * *

UNITED STATES PATENT AND TRADEMARK OFFICE
CERTIFICATE OF CORRECTION

PATENT NO. : 4,708,974

DATED : November 24, 1987

INVENTOR(S) : P. W. Chang et al

It is certified that error appears in the above-identified patent and that said Letters Patent is hereby corrected as shown below:

In claim 1, delete " 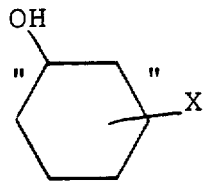 "

and insert -- 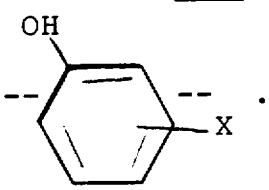 -- .

In claim 1, delete "CH2SO$_3$Na"

and insert -- CH$_2$SO$_3$Na -- .

Signed and Sealed this

Twenty-fourth Day of May, 1988

Attest:

DONALD J. QUIGG

Attesting Officer

Commissioner of Patents and Trademarks